(12) United States Patent
Kim et al.

(10) Patent No.: US 12,237,808 B2
(45) Date of Patent: Feb. 25, 2025

(54) APPARATUS FOR ANALYZING LIGHT-INDUCED DEGRADATION AND LID HEALING PROCESS CHARACTERISTIC OF SOLAR CELL MODULE

(71) Applicant: Gumi Electronics & Information Technology Research Institute, Gyeongsangbuk-do (KR)

(72) Inventors: Soo Min Kim, Gyeongsangbuk-do (KR); Min Kwang Seok, Gyeongsangbuk-do (KR)

(73) Assignee: Gumi Electronics & Information Technology Research Institute, Gyeongsangbuk-do (KR)

( * ) Notice: Subject to any disclaimer, the term of this patent is extended or adjusted under 35 U.S.C. 154(b) by 729 days.

(21) Appl. No.: 17/355,471

(22) Filed: Jun. 23, 2021

(65) Prior Publication Data
US 2022/0399855 A1    Dec. 15, 2022

(30) Foreign Application Priority Data

Jun. 15, 2021  (KR) ........................ 10-2021-0077514

(51) Int. Cl.
*H02S 50/00* (2014.01)
*H01F 7/20* (2006.01)

(52) U.S. Cl.
CPC ............... *H02S 50/00* (2013.01); *H01F 7/20* (2013.01)

(58) Field of Classification Search
CPC . H02S 50/00; H02S 50/10; H01F 7/20; Y02E 10/50; Y02E 10/56
See application file for complete search history.

(56) References Cited

U.S. PATENT DOCUMENTS

2016/0141443 A1* 5/2016 Cascant-Lopez ..... H01L 31/186 438/90

* cited by examiner

*Primary Examiner* — Su C Kim
(74) *Attorney, Agent, or Firm* — Heslin Rothenberg Farley & Mesiti P.C.

(57) ABSTRACT

According to the inventive concept, an apparatus for analyzing a light-induced degradation (LID) phenomenon and healing characteristics of a p-type solar cell module, the apparatus being that analyzes LID reduction characteristics of the solar cell module includes a resonant heating mechanism, an induction coil plate, a treatment unit and a monitoring unit.

3 Claims, 13 Drawing Sheets

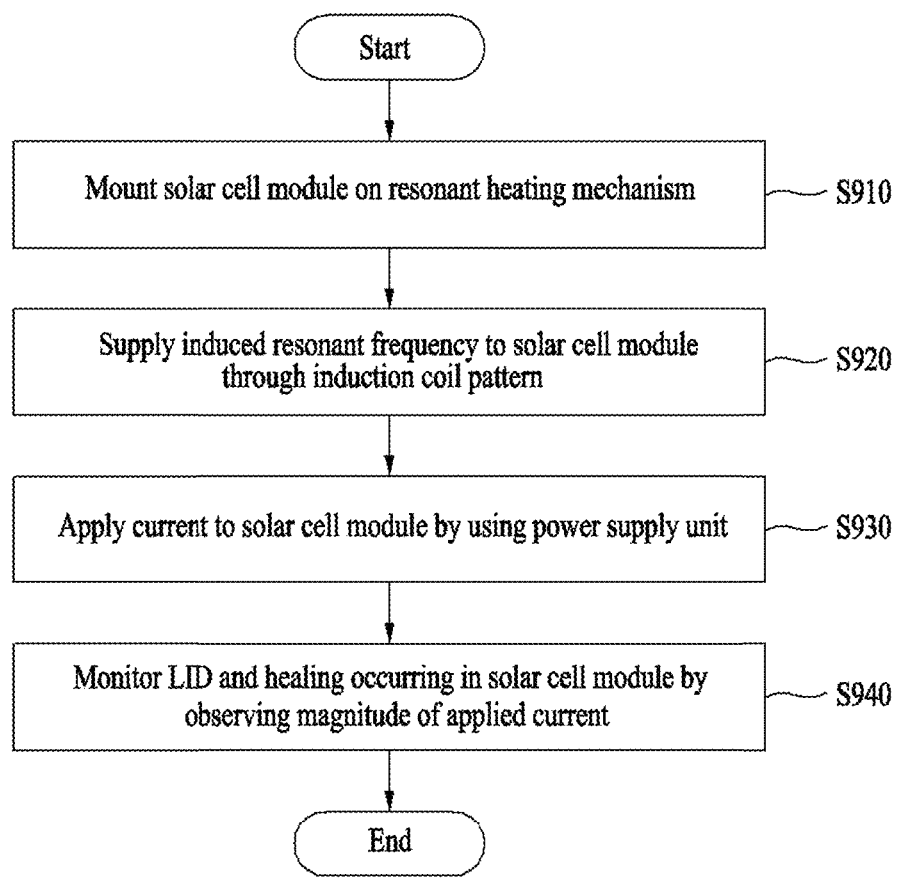

APPARATUS FOR ANALYZING LIGHT-INDUCED DEGRADATION AND LID HEALING PROCESS CHARACTERISTIC OF SOLAR CELL MODULE

CROSS REFERENCE TO RELATED APPLICATIONS

This application claims priority under 35 U.S.C. § 119 to Korean Patent Application No. 10-2021-0077514 filed on Jun. 15, 2021, in the Korean Intellectual Property Office, which is incorporated herein by reference in its entirety.

BACKGROUND

Embodiments of the inventive concept described herein relate to an apparatus and a method for analyzing a light-induced degradation and heating characteristics of a solar cell module, and more particularly, to a technology of measuring and analyzing solar cells by selectively heating only the solar cells and reducing light-induced degradation with a high-frequency electromagnetic field through injection of current in unit of a module and by using a half-bridge resonance circuit while not heating a p-type solar cell module.

In the solar cell industries, demand for high-efficiency solar cells has increased as the importance of levelized costs for electricity has increased. In general, p-type passivated emitter rear cell (PERC) solar cells have been most widely used in the industry, and have an efficiency of about 22% to 23%. It has been reported that the p-type solar cells have a light-induced degradation phenomenon, in which the outputs of the solar cells continuously decrease in a power generation situation, in which light is irradiated, and the decreases of the outputs are influenced more greatly as the reference efficiency of the solar cells increase. In conclusion, because the decreases of the outputs of the ultra-high-efficiency solar cells, demand of which has been increased recently, are very large, a technology for preventing the problem has been required.

As a technology for preventing light-induced degradation, a regeneration process of applying light and heat of 100° C. or more to a solar cell was released, and prevents a decrease of performance during outdoor power generation through continuous recovery of output after the light-induced degradation process. However, the regeneration state formed through a healing process is a meta-stable state that a dark state returns to an initial state for 10 minutes at 180° C. to 200° C. In the modulization process of the solar cells, a process of heating the solar cells for 20 minutes at a temperature range of 180° C. to 200° C. when the solar cells are packaged is performed through a lamination process. For the reason, the regeneration state constructed in the solar cell step disappears while undergoing a module manufacturing process, and the module installed outdoor causes the LID process again. In order to solve the problems, the regeneration state has to be formed after the solar cell module manufacturing process is completed. However, units for transferring heat to the solar cells in an encapsulant after the solar cell module is finished are not sufficient, the studies on the problem has not been made yet.

Furthermore, the light-induced degradation phenomenon of the solar cell module mainly occurs in the p-type solar cells, reduction of the light-induced degradation of the solar cells has to be considered, but because the technology for reducing the light-induced degradation and evaluating the degradation characteristics of the conventional solar cells is performed for solar cells, the reduction of the light-induced degradation is initialized after the module lamination process.

SUMMARY

An objective of the inventive concept is to reduce, measure, and analyze a light-induced degradation (LID) phenomenon that occurs in a solar cell module.

According to an aspect of the inventive concept, an apparatus for analyzing a light-induced degradation (LID) phenomenon and healing characteristics of a p-type solar cell module, the apparatus being that analyzes LID reduction characteristics of the solar cell module, includes a resonant heating mechanism, on which the solar cell module is mounted, and that measures and analyzes the LID characteristics of the solar cell module, an induction coil plate including a coil that forms an induced magnetic field in an interior of the resonant heating mechanism and an inverter that generates a high-frequency induced AC electromagnetic field, a treatment unit that supplies selective exciting electric power and heat to solar cells in an interior of the solar cell module through the induction coil plate, and a monitoring unit that measures and analyzes a degree, by which the LID and the healing occur, through measurement of LID reduction states and characteristics measured by the solar cell module.

According to an aspect of the inventive concept, a method for analyzing a light-induced degradation (LID) phenomenon and healing characteristics of a p-type solar cell module by an apparatus for analyzing the LID phenomenon and the healing characteristics of the p-type solar cell module, the apparatus being configured to analyze LID reduction characteristics of the solar cell module, includes mounting the solar cell module on a resonant heating mechanism to measure and analyze the LID characteristics of the solar cell module, supplying an induced resonant frequency to the solar cell module through an induction coil plate formed in the interior of the resonant heating mechanism, applying a current to the solar cell module, and monitoring the LID and the healing that occur in the solar cell module by observing a magnitude of the current applied to the solar cell module.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 9 illustrates an operation flowchart of a method for analyzing LID characteristics of a solar cell module according to an embodiment of the inventive concept.

DETAILED DESCRIPTION

Figure 1:
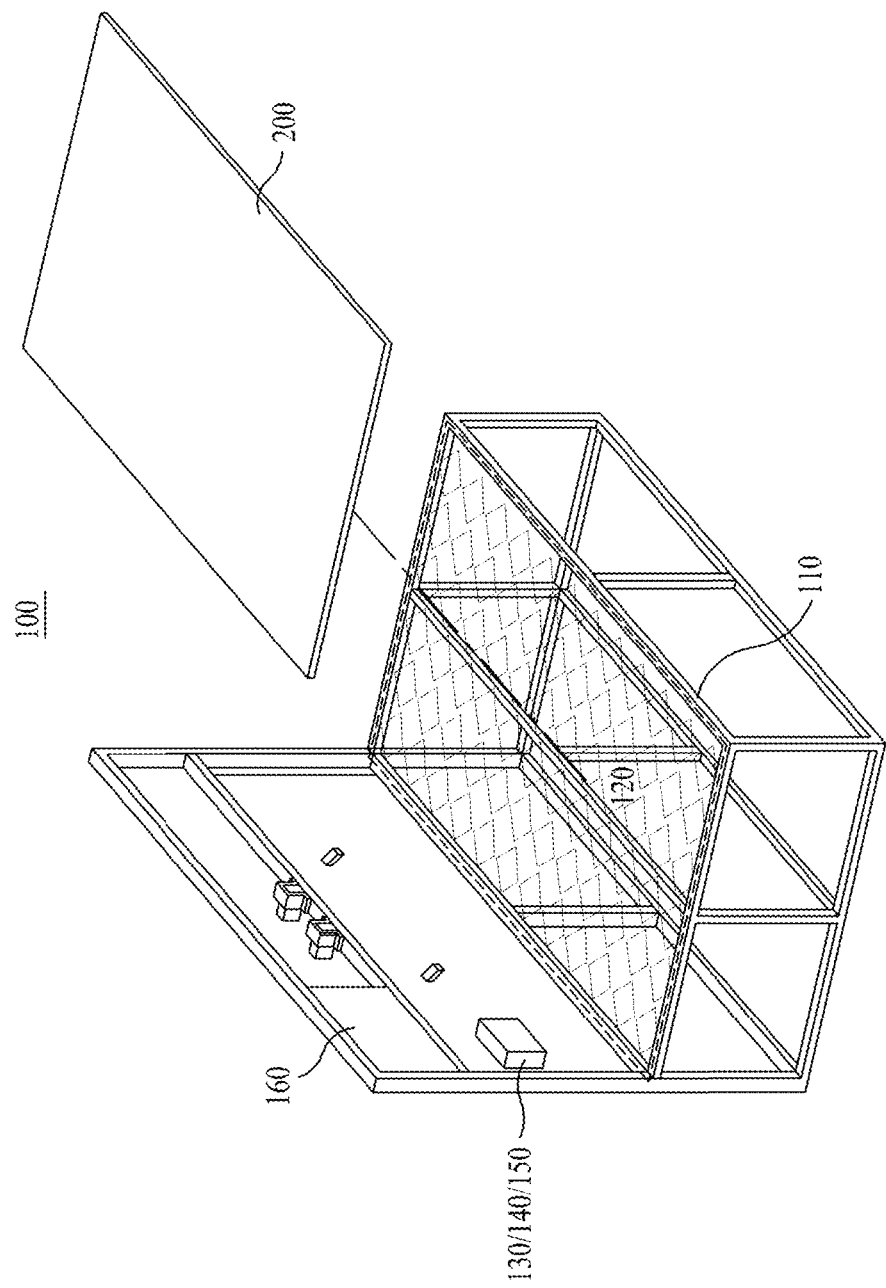
FIG. 1 illustrates a diagram of an apparatus for analyzing light-induced degradation (LID) characteristics of a solar cell module according to an embodiment of the inventive concept.

The above and other aspects, features, and advantages of the inventive concept will become apparent from the following description of the following embodiments given in conjunction with the accompanying drawings. However, the inventive concept is not limited by the embodiments disclosed herein but will be realized in various different forms, and the embodiments are provided only to make the disclosure of the inventive concept complete and fully inform the scope of the inventive concept to an ordinary person in the art, to which the inventive concept pertains, and the inventive concept will be defined by the scope of the claims.

The terms used herein are provided to describe the embodiments but not to limit the inventive concept. In the specification, the singular forms include plural forms unless particularly mentioned. The terms "comprising" and/or "comprises" used in the specification mean that the mentioned elements, steps, operations, and/or devices do not exclude existence or addition of one or more other elements, steps, operations, and/or devices.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, preferred embodiments of the inventive concept will be described in detail with reference to the accompanying drawings. The same elements on the drawings will be denoted by the same reference numerals, and a description of the same elements will not be repeated.

An apparatus and a method for analyzing light-induced degradation (LID) characteristics of a solar cell module according to embodiments of the inventive concept are mainly directed to reducing LID by selectively heating only solar cells in an interior of a solar cell module through injection of a current in unit of a module and with a high-frequency electromagnetic field using a half-bridge resonance circuit without heating the entire solar cell module from the outside, and measuring and analyzing the reduced LID.

According to the inventive concept, only the solar cells are heated through remote control while an encapsulant of the solar cell module is not damaged by utilizing a heating scheme using an induced magnetic field whereby a regenerative state is formed. Then, the half-bridge resonance circuit is used to apply the induced magnetic field, and temperatures of the solar cells are adjusted by adjusting a magnitude of the current that flows through a coil. Furthermore, a temperature of a rear surface of the solar cell module was observed by using an infrared ray temperature sensor to observe the temperatures of the solar cells, and the solar cell module, to which a thermocouple was attached, was mounted on a surface of an aluminum (Al) electrode on the rear surfaces of the solar cells to correct an error due to the encapsulant, and then was tested and corrected. A temperature distribution in the interior of the module is analyzed through an infrared ray camera to identify whether only the solar cells are heated, and the lifespan of minority carriers according to a change of time is identified through a change in a current injected to observe the open voltage forms of the solar cells in real time. Finally, the LID activating energy generated in the regeneration process of the solar cell module is analyzed by applying a kinetic simulation of the regeneration process by utilizing the observed real-time current change data.

In conclusion, a nondestructive LID preventing technology in unit of a solar cell module was developed by analyzing a regeneration state for preventing an LID phenomenon in a solar cell module step and extracting the LID activating energy of the solar cell module.

Hereinafter, an apparatus and a method according to the embodiments of the inventive concept, which are illustrated in FIGS. 1 to 9, will be described in detail.

FIG. 1 illustrates a diagram of an apparatus for analyzing light-induced degradation (LID) characteristics of a solar cell module according to an embodiment of the inventive concept.

Referring to FIG. 1, an apparatus 100 for analyzing LID characteristics of a solar cell module according to an embodiment of the inventive concept includes a resonant heating mechanism 110, an induction coil plate 120, a treatment unit 130, a power supply unit 140 and a monitoring unit 160.

As illustrated in FIG. 1, the apparatus 100 for analyzing LID characteristics of the solar cell module according to the embodiment of the inventive concept is manufactured by designing an opening type mechanism to efficiently mount and monitor the solar cell module. The apparatus 100 for analyzing LID characteristics of a solar module according to the embodiment of the inventive concept is designed to easily dispose electric components by disposing the electric components on a rear surface 170 of a large-capacity heating mechanism to easily correct the disposition of the electric components that are suitable for healing characteristics of a solar cell module 200, to easily recognize interconnections between the electric components to correct them, and to minimize a phenomenon in which an electric power load is biased to one side such that the lifespan of the solar cells is decreased as high-capacity rectifiers for generating resonance frequencies are disposed in parallel.

The solar cell module is mounted on the resonant heating mechanism 110 to measure and analyze the LID characteristics of the solar cell module.

The resonant heating mechanism 110 correspond to a location, at which the solar cell module 200 of the apparatus 100 for analyzing LID characteristics is mounted, and is located in parallel to the bottom surface to maintain a vertical load due to the dead load of the solar cell module 200.

The induction coil plate 120 includes a coil that forms an induced magnetic field in an interior of the resonant heating mechanism 110 and an inverter that generates a high-frequency induced AC electromagnetic field.

Referring to FIG. 1, the induction coil plate 120 is formed along an area of the resonant heating mechanism 110, and is located horizontally at a lower portion of the resonant heating mechanism 110 to apply a vertical load due to the dead load of the solar cell module. In addition, the induction coil plate 120 is designed not to generate vibration or an unbalance of the weight thereof in a situation, in which the solar cell module 200 is mounted on the resonant heating mechanism 110, and may be easily mounted and separated by an operator by using a frame of the solar cell module.

The induction coil plate 120 may generate an induced AC magnetic field by using a half-bridge resonance circuit. Furthermore, the apparatus 100 for analyzing LID characteristics of a solar cell module according to the embodiment of the inventive concept forms a resonant frequency by consuming DC power supplied by the rectifier in the half-bridge resonance circuit, and corresponds to a high-speed switching structure that may interrupt the electric power supplied by the rectifier through a potential-induced degradation (PID) controlling apparatus by utilizing a solid state relay (SSR) to prevent excessive overheating when a temperature of the solar cell module rises to a preset value or more.

The induction coil plate 120 may include a plurality of coil holes on a surface thereof such that the frame of the solar cell module 200 is located deep. The coil holes will be described in detail with reference to FIG. 8 as follows.

The treatment unit 130 selectively supplies exciting electricity and heat to the solar cells in the interior of the solar cell module through the induction coil plate 120.

The treatment unit 130 may supply an induced resonant frequency of an AC waveform to the solar cell module 200 located in the resonant heating mechanism 110 through the inverter. Furthermore, the treatment unit 130 may apply a uniform current to the solar cell module through the power supply unit 140 that excites the solar cell module 200. In detail, when the solar cell module 200 is seated on the resonant heating mechanism 110, the treatment unit 130 may supply an induced resonant frequency of 40 kHz of an AC waveform to the solar cell module 200. Accordingly, when the induced resonant frequency is supplied to the solar cell module 200, a temperature environment for reduction of LID is created by selectively heating only the cell in the interior of the solar cell module with the induced magnetic field. Thereafter, a uniform current may be applied by using an external power supply device that may excites the solar cell module 200, that is, the power supply unit 140.

The power supply unit 140 is a switched mode power supply (SMPS), and electric power may be supplied to the induction coil plate 120 to apply a frequency and a current to the solar cell module 200 located in the resonant heating mechanism 110.

The monitoring unit 160 measures and analyzes a degree, by which LID and healing occur, through measurement of the LID reduction state and characteristics, which are measured in the solar cell module.

The monitoring unit 160 may monitor the LID and the healing occurring in real time by monitoring the magnitude of the current applied to the solar cell module 200 by the treatment unit 130. In FIG. 1, the monitoring unit 160 may be located toward the front panel of the apparatus 100 for analyzing LID characteristics such that the LID and the healing of the solar cell module may be monitored. Furthermore, the apparatus 100 for analyzing LID characteristics of a solar cell module according to the embodiment of the inventive concept improves the efficiency of a working space by disposing an infrared ray temperature sensor unit 150 that may sense a surface temperature of the solar cell module in a noncontact scheme like the monitoring unit 160, and the power supply unit 140 that may supply electric power when a target temperature is reached, on the front panel.

The apparatus 100 for analyzing LID characteristics of a solar cell module according to the embodiment of the inventive concept applies an induced resonant frequency of 40 kHz by applying electric power of 4000 W to the solar cell module 200 through the inverter to artificially provide an LID reduction state to the solar cell module. Accordingly, a degree, by which the LID and the healing occur, may be measured through measurement of the LID reduction and real-time characteristics.

Figure 2:
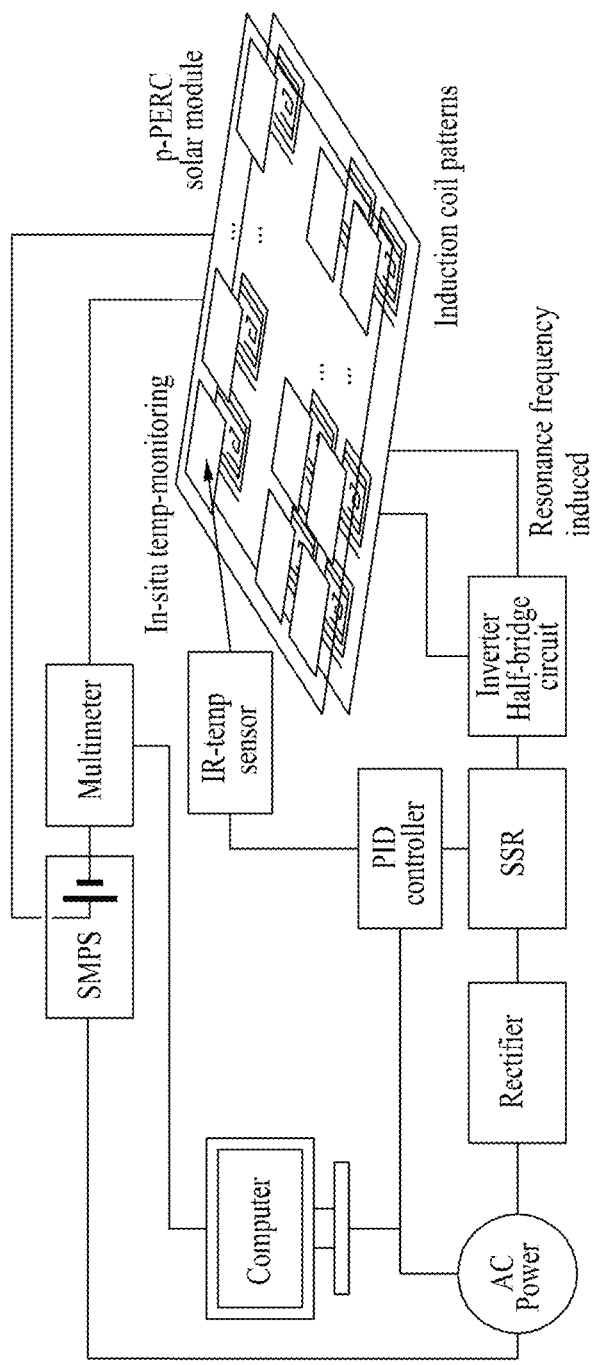
FIG. 2 illustrates a conceptual view of a chamber structure for performing a LID healing process according to an embodiment of the inventive concept.

FIG. 2 illustrates a conceptual view of a chamber structure for performing a LID healing process according to an embodiment of the inventive concept.

In order to perform induction heating of a solar cell module having 72 cells, a new heating device that has not been present conventionally has to be developed, and because the size of the module that is to be applied increases from 20 cm by 20 cm to 190 cm by 98 cm by 46.56 times, a scale-up process for the components is essentially required. Accordingly, decomposition of a control device and a power source that are necessary for a process, and a connection concept of sensors for identifying various states will be described through the conceptual view illustrated in FIG. 2.

Referring to FIG. 2, the solar cell module is located at an upper portion of the induction coil plate, and an infrared ray temperature sensor unit (or an IR-temp sensor) that may identify the temperature of a surface of the solar cell module in a noncontact scheme is coupled to the solar cell module. Furthermore, the infrared ray temperature sensor unit is coupled to the PID controller that may control the electric power of the coil, which applies heat to the solar cell module, and is connected such that data on how the energy applied by an electric power source increases the temperature in the interior of the solar cell module are fed back.

The power supply unit corresponding to high-capacity heating equipment is applied based on AC power, and supplies all energy that is necessary for computer control equipment, an inverter, a high-frequency oscillator, a sensor unit, and a carrier injector through the electric power source. Then, the supplied energy sources are largely classified into three kinds to be supplied, and may include a rectifier corresponding to main electric power, an electric component control device, and an external power application power source.

The main electric power is consumed by the rectifier that may convert AC power to DC power to supply the DC power, and converts electric power corresponding to 220 VAC and 10 AAC to electric power corresponding to 48 VDC and 62 ADC to supply the electric power to the half-bridge resonance circuit, and it is determined that the electric power that is finally necessary after the simulated calculation result requires electric power of about 6000 W.

The inventive concept includes a structure that supplies electric power in a scheme, in which two rectifiers of 3000 W are connected to each other in parallel by utilizing the result that derives the necessary specifications, and in the designed structure, an efficient power distribution structure is obtained by disposing one inverter for twelve solar cells by utilizing six half-bridge resonance circuits.

Figure 3:
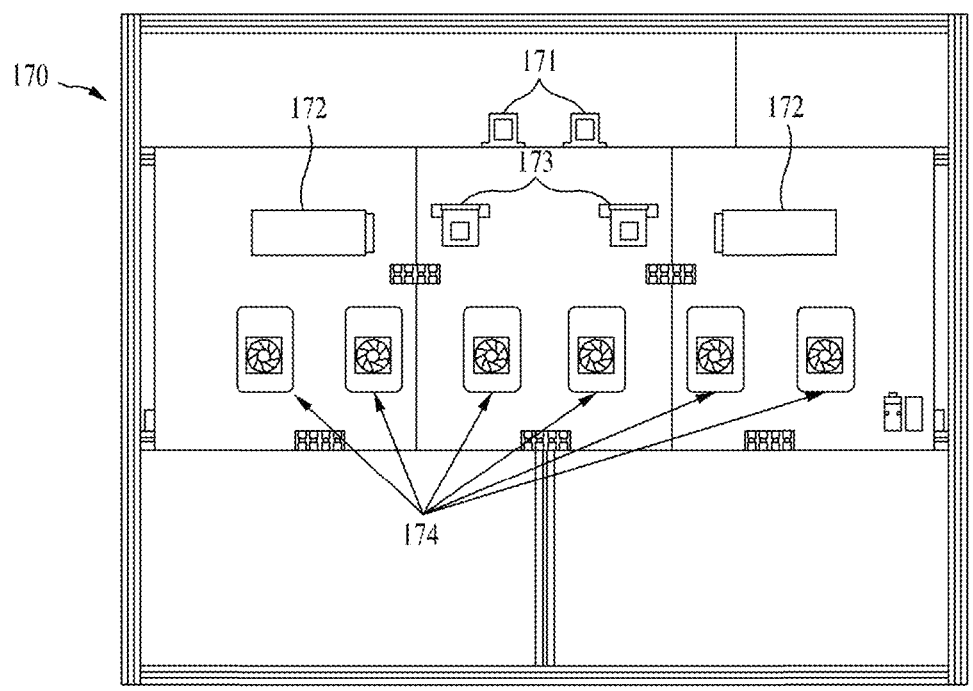
FIG. 3 illustrates a front view of a rear panel before a solar cell module is mounted, according to an embodiment of the inventive concept.

FIG. 3 illustrates a front view of a rear panel before a solar cell module is mounted, according to an embodiment of the inventive concept.

Referring to FIG. 3, the rear panel 170 includes a PID controller 171, a rectifier 172, a solid-state relay (SSR) 173, and an inverter/half-bridge resonance circuit 174.

In the apparatus 100 for analyzing LID characteristics of a solar cell module according to the embodiment of the inventive concept, as illustrated in FIG. 3, electric components are disposed on the rear panel 170 to easily correct the disposition of the electric components that are suitable for heating of the solar cell module in the analysis process. Accordingly, the interconnections of the components may be easily recognized and corrected, and a phenomenon in which an electric power load is biased to one side such that the lifespan of the solar cells is decreased as high-capacity rectifiers 172 for generating resonance frequencies are disposed in parallel may be minimized.

As illustrated in the conceptual view of FIG. 2, the DC power supplied by the rectifier 172 is consumed by the half-bridge resonance circuit 174 to form a resonant frequency, and the apparatus 100 for analyzing LID characteristics of a solar cell module according to the embodiment of the inventive concept corresponds to an ultra-high-speed switching structure that interrupts the electric power supplied by the rectifier 172 through the PID controller 171 by utilizing the SSR 173 to prevent excessive overheating that occurs when the temperature of the solar cell module rises to a preset value or more.

Accordingly, in the apparatus 100 for analyzing LID characteristics of a solar cell module according to the embodiment of the inventive concept, a high-precision temperature control system that cannot be easily achieved by a mechanical switch may be constructed by allowing a non-contact control through the switching structure of the SSR 173 via control of the PID 171, and a fire or a short-circuit due to accumulation of heat may be prevented because the heat generated due to the electric power consumed for driving of the system may be controlled while being separated from a solar cell model.

Figure 4A:
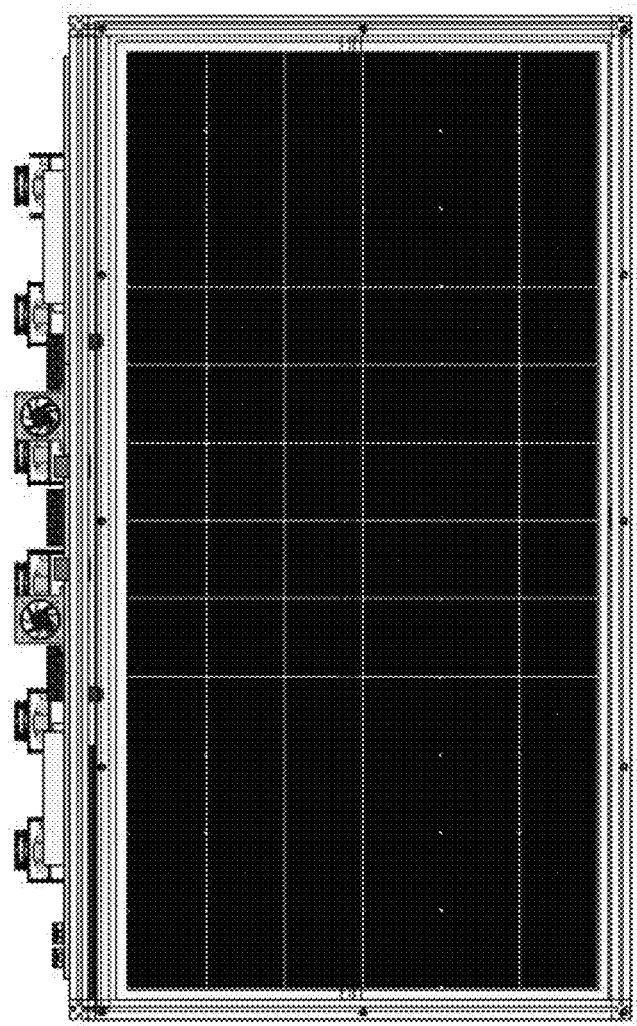
FIGS. 4A to 4C illustrate a coil pattern in an induction coil plate according to an embodiment of the inventive concept.
Figure 4B:
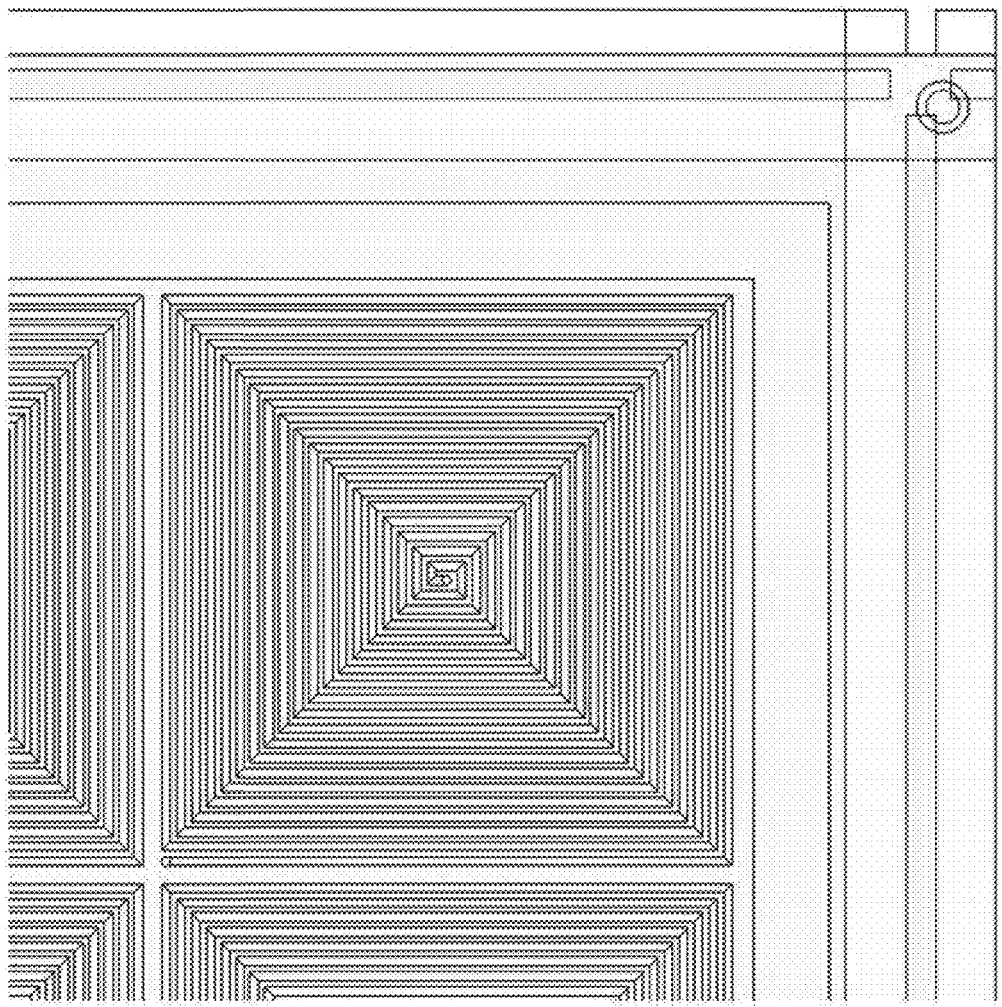
Figure 4C:
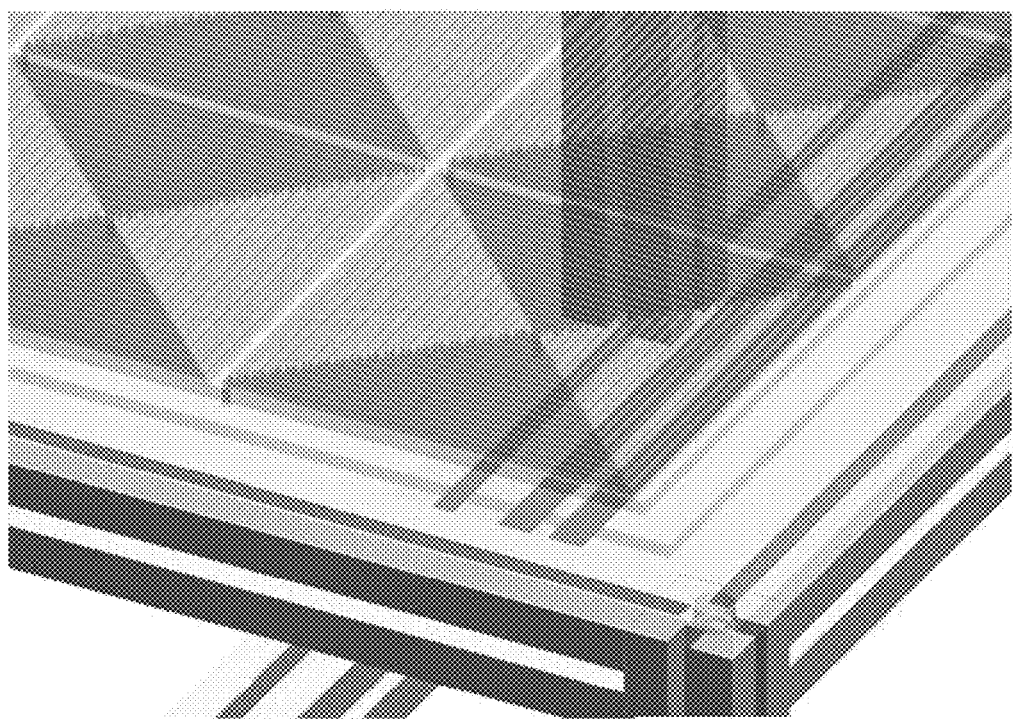
Figure 5:
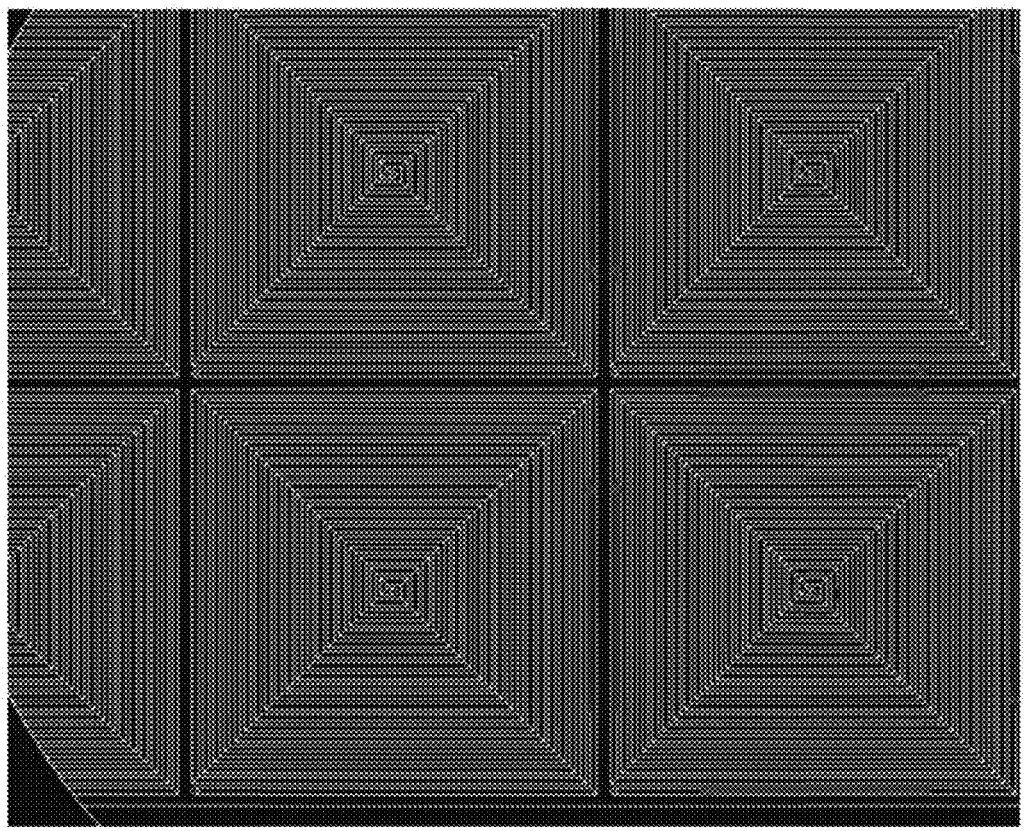
FIG. 5 illustrates an image that represents current flows between coils according to an embodiment of the inventive concept.

FIGS. 4A to 4C illustrate a coil pattern in an induction coil plate according to an embodiment of the inventive concept. FIG. 5 illustrates an image that represents current flows between coils according to an embodiment of the inventive concept.

FIG. 4A illustrates an induction coil plate, and FIGS. 4B and 4C illustrate enlarged image of the coil pattern. Furthermore, FIG. 5 illustrates an image of a design of control of current flows between the coils in the induction coil plate.

The forms illustrated in FIGS. 4B and 4C are obtained by designing the induction coil plate with a basic assumption that one coil pattern is disposed for one solar cell in the interior of the solar cell module. In the structure, the patterns are repeatedly disposed, the magnetic fields generated in the patterns show reinforced or damped characteristics according to the directions of the currents that pass through the starting points and the ending points of the coils.

The consumed electric power becomes different due to the magnetic field reinforced and damped characteristics, and the finally applied heat of the module may be changed. The changes are associated with the deviations, by which the temperature is changed in a wide area of the 72 cells corresponding to 18,620 cm$^2$ so that precise designs and analyses are necessary.

As may be seen in FIG. 5, it may be identified that the directions of the currents in input parts of the coils starting from the centers of two upper and lower patterns have to be opposite to each other to reinforce the patterns, and in the form, coupling in a very complex form in the patterns of the structure of 72 cells has to be considered.

The apparatus 100 for analyzing LID characteristics of a solar cell module according to the embodiment of the inventive concept includes a coil manufactured in a form that may easily change the coupling because it is difficult to collectively define the coupling and an aspect of distribution of magnetic fields and induction heating may vary according to the form of the coupling.

Figure 6A:
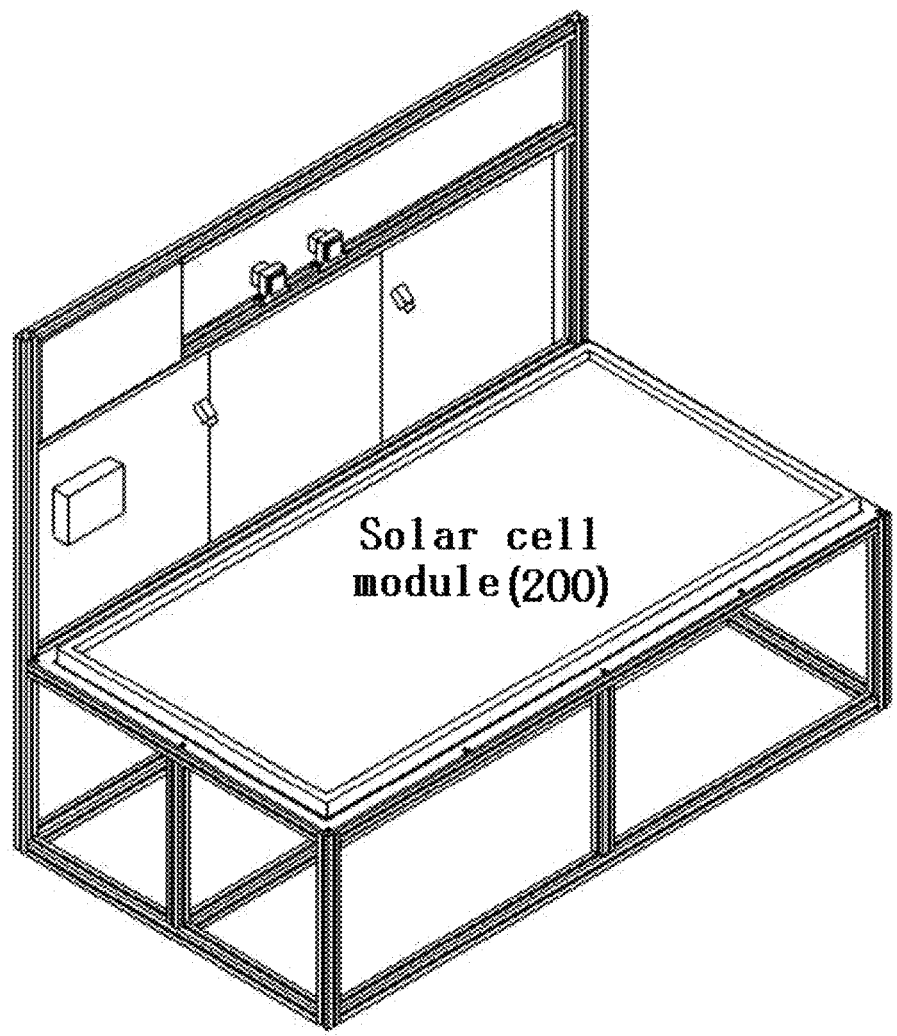
FIGS. 6A and 6B illustrate a diagram of an apparatus for analyzing LID characteristics of a solar cell module, on which the solar cell module is mounted, according to an embodiment of the inventive concept.
Figure 6B:
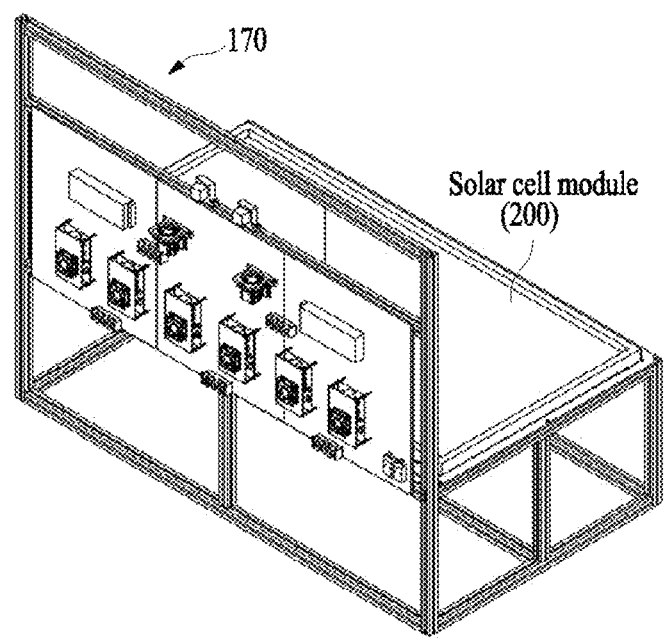

FIGS. 6A and 6B illustrate a diagram of an apparatus for analyzing LID characteristics of a solar cell module, on which the solar cell module is mounted, according to an embodiment of the inventive concept. Furthermore, FIG. 7A illustrates an elevation view of an apparatus for analyzing LID characteristics of a solar cell module, on which the solar cell module is mounted, according to an embodiment of the inventive concept, and FIG. 7B illustrates an elevation view of a lower structure of an induction coil plate, on which the solar cell module is mounted, according to an embodiment of the inventive concept.

Referring to FIGS. 6A and 6B, the solar cell module 200 mounted on the resonant heating mechanism according to the embodiment of the inventive concept is illustrated.

Figure 7A:
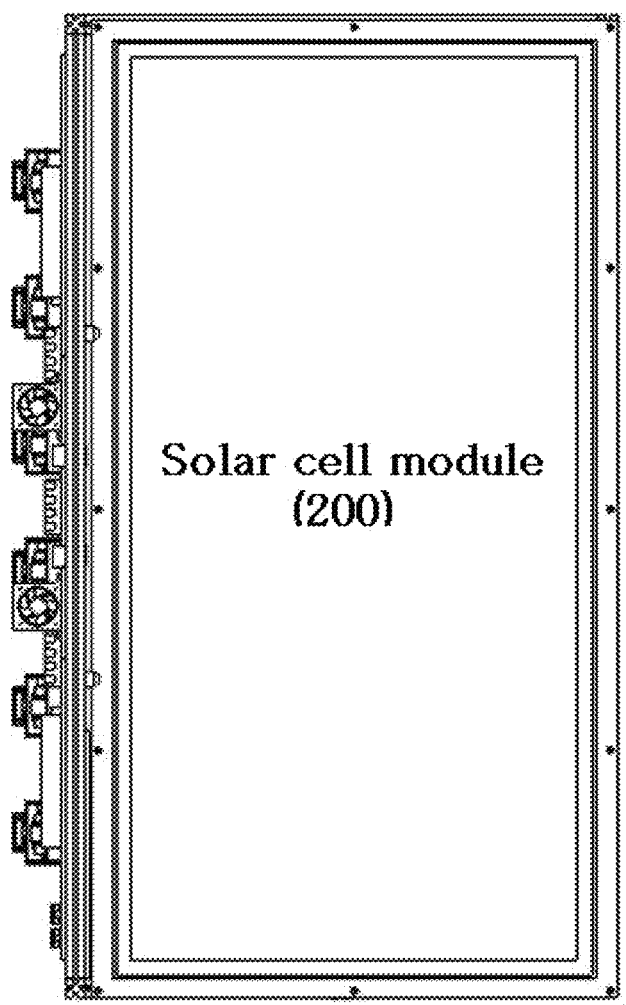
FIG. 7A illustrates an elevation view of an apparatus for analyzing LID characteristics of a solar cell module, on which the solar cell module is mounted, according to an embodiment of the inventive concept.
Figure 7B:
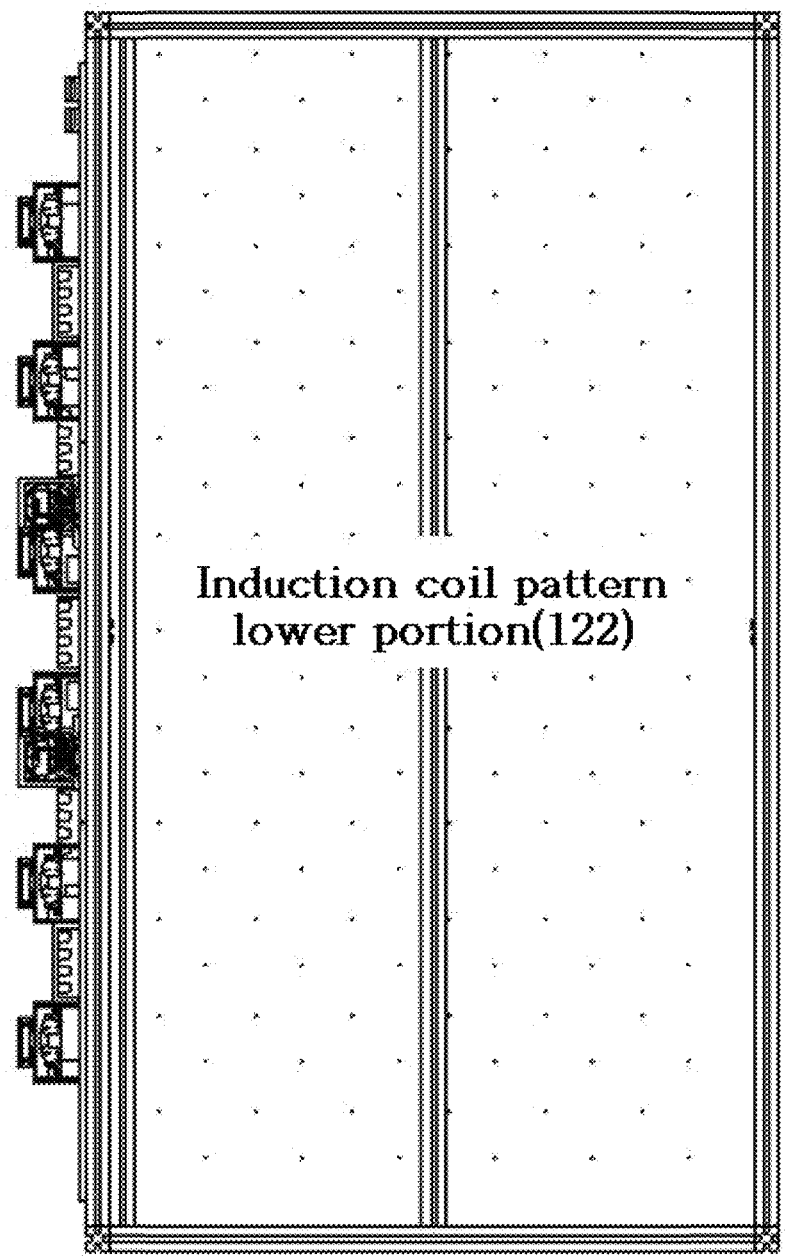
FIG. 7B illustrates an elevation view of a lower structure of an induction coil plate, on which the solar cell module is mounted, according to an embodiment of the inventive concept.

Referring to FIG. 7A, the disposition of the solar cell module may be identified, and referring to FIG. 7B, the wiring locations of the coils for induction heating of the solar cells may be identified. Accordingly, referring to FIGS. 7A and 7B, in the apparatus 100 for analyzing LID characteristics of a solar cell module according to the embodiment of the inventive concept, the coils are inserted while the starting point and the ending point of the induction coil plate 122 located at the lower portion of the solar cell module, and a terminal structure that may be coupled after the patterns are changed is applied such that the inserted coils have magnetic field reinforced or damped characteristics. Furthermore, when the starting point and the ending point are applied in the same direction, it is determined that damping characteristics may be shown, and when it is applied in an opposite way, easy heating may be possible by using magnetic field reinforced characteristics.

Figure 8:
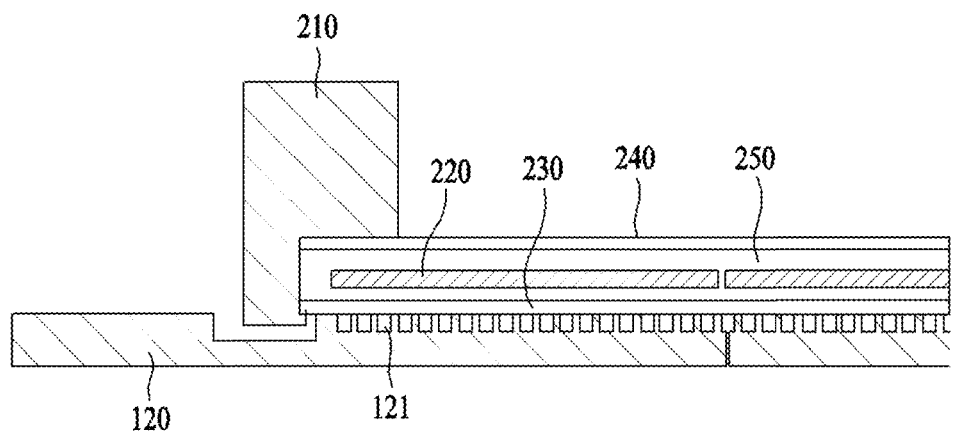
FIG. 8 illustrates a conceptual view of a jig structure for an LID healing process of a solar cell module according to an embodiment of the inventive concept.

FIG. 8 illustrates a conceptual view of a jig structure for an LID healing process of a solar cell module according to an embodiment of the inventive concept.

In more detail, FIG. 8 illustrates a conceptual view for explaining a principle of heating solar cells in an interior of a module in remote control while an induction coil contacts a front glass of the solar cell module.

Referring to FIG. 8, a front glass 230 of the solar cell module is adhered to the induction coil plate 120 so that an induced magnetic field is applied to all the solar cells 220 in the interior of the solar cell module.

The inventive concept illustrates a physical structure as illustrated in FIG. 8 to use the module produced in the solar cell module manufacturing process as it is. The solar cell module 200 includes a solar cell module frame 210 and solar cells 220 in an interior of the solar cell module frame 210, includes the front glass 230 that contacts the induction coil plate 120 and a solar cell module back sheet 240, and includes a solar cell module EVA encapsulant 250 that surrounds the solar cells 220 between the solar cell module back sheet 240 and the front glass 230.

The inventive concept shows a structure, in which an induced magnetic field may be applied to all the solar cells in the interior of the solar cell module by allowing the front glass 230 of the solar cells and the induction heating coils 120 and 121 to contact each other, and the location of the solar cell module may be easily fixed and the attachment performance of the induction coils may be increased by disposing an induction coil hole 121, into which the solar cell module frame 210 may be inserted, in the induction coil plate 120, into which the induction coils are inserted.

As illustrated in FIG. 8, the induction coils may be completely attached to the front glass 230 of the solar cells so that the intensities of the magnetic fields that becomes weaker in proportion to the square of the distances may be maintained high, and an error that may be generated in the process may be minimized because the coils may be always disposed at the same locations.

FIG. 9 illustrates an operation flowchart of a method for analyzing LID characteristics of a solar cell module according to an embodiment of the inventive concept.

Referring to FIG. 9, in S910, the solar cell module is mounted on a resonant heating mechanism to measure and analyze the LID characteristics of the solar cell module.

In S920, an induced resonant frequency is supplied to the solar cell module through an induction coil plate formed in the interior of the resonant heating mechanism.

In S920, when the induced resonant frequency is supplied to the solar cell module 200, a temperature environment for reduction of LID is created by selectively heating only the cell in the interior of the solar cell module with the induced magnetic field.

In S930, a current is applied to the solar cell module by using the power supply unit that supplies electric power to the induction coil plate. In S930, a uniform current may be applied to the solar cell module by using the power supply unit that excites the solar cell module.

In S940, the LID and healing that occur in the solar cell module is monitored by observing the magnitude of the applied current.

The above-described system or apparatus may be realized by a hardware element, a software element, and/or a combination of a hardware element and a software element. For example, the apparatus and the elements described in the embodiments, for example, may be realized by using one or more general-purpose computer or a specific-purpose computer such as a processor, a controller, an arithmetic logic unit (ALU), a digital signal processor, a microcomputer, a field programmable array (FPA), a programmable logic unit (PLU), a microprocessor, or any device that may execute and respond to an instruction. The processing device may perform an operation system and one or more software applications performed on the operating system. Further, the processing device may access, data, manipulate, process, and produce data in response to execution of software. Although one processing device is used for convenience of understanding, it may be easily understood by those skilled in the art that the processing device may include a plurality of processing elements and/or a plurality of types of processing elements. For example, the processing device may include a plurality of processors or one processor and one controller. Further, another processing configuration, such as a parallel processor, may be possible.

The software may include a computer program, a code, an instruction, or a combination of one or more thereof, and the processing device may be configured to be operated as desired or commands may be made to the processing device independently or collectively. The software and/or data may be permanently or temporarily embodied in any type of machine, a component, a physical device, virtual equipment, a computer storage medium or device, or a signal wave transmitted in order to be interpreted by the processing device or to provide an instruction or data to the processing device. The software may be dispersed on a computer system connected to a network, to be stored or executed in a dispersive method. The software and data may be stored in one or more computer readable recording media.

The method according to the embodiment may be implemented in the form of a program instruction that may be performed through various computer means, and may be recorded in a computer readable medium. The computer readable medium may include a program instruction, a data file, and a data structure alone or in combination thereof. The program instruction recorded in the medium may be designed or configured particularly for the embodiment or may be a usable one known to those skilled in computer software. An example of the computer readable recording medium may include magnetic media such as a hard disk, a floppy disk, and a magnetic tape, optical recording media such as a CD-ROM and a DVD, magneto-optical media such as a floptical disk, and hardware devices that are particularly configured to store and perform a program instruction, such as a ROM, a RAM, and a flash memory. Further, an example of the program instruction may include high-level language codes which may be executed by a computer using an interpreter as well as machine languages created by using a compiler. The above-mentioned hardware device may be configured to be operated as one or more software module to perform operations of various embodiments, and the converse is applied.

According to an embodiment of the inventive concept, LID may be reduced by selectively heating only solar cells in an interior of a solar cell module through injection of a current in unit of a module and with a high-frequency electromagnetic field using a half-bridge resonance circuit without heating the entire solar cell module from the outside, and the reduced LID may be measured.

Furthermore, the embodiment of the inventive concept may be applied to a solar cell module through a technology of reducing, measuring, and analyzing the light-induced degradation of the solar cell module, may improve efficiency in an aspect of costs, and may greatly shorten the time consumed to an light-induced degradation reduction and characteristic test for the solar cell module shortly before the solar cell module is installed outdoors.

Further, according to the embodiment of the inventive concept, characteristics for the degradation phenomenon may be tested reliably and characteristics for the light-induced degradation reduction phenomenon may be quantitatively determined by providing a remote heating technology using an induction heating scheme to induce a light-inducted degradation reduction state of the solar cell module, an inverter technology for high-frequency wave conversion, and a technology for setting, analyzing, and modeling an environment parameter for inducing a light-induced degradation reduction state.

Although the embodiments of the present disclosure have been described with reference to the limited embodiments and the drawings, the present invention may be variously corrected and modified from the above description by those skilled in the art to which the present invention pertains. For example, the above-described technologies can achieve a suitable result even though they are performed in different sequences from those of the above-mentioned method and/or coupled or combined in different forms from the method in which the constituent elements such as the system, the architecture, the device, or the circuit are described, or replaced or substituted by other constituent elements or equivalents.

Therefore, the other implementations, other embodiments, and the equivalents of the claims pertain to the scope of the claims.

What is claimed is:

1. An apparatus for analyzing a light-induced degradation (LID) phenomenon and healing characteristics of a p-type solar cell module, the apparatus being configured to analyze LID reduction characteristics of the solar cell module, the apparatus comprising:
   a resonant heating mechanism, on which the solar cell module is mounted, and configured to measure and analyze the LID reduction characteristics of the solar cell module;
   an induction coil plate including a coil that forms an induced magnetic field in an interior of the resonant heating mechanism and an inverter that generates a high-frequency induced AC electromagnetic field;
   a treatment unit configured to supply selective exciting electric power and heat only to solar cells in an interior of the solar cell module with the induced magnetic field generated from the induction coil plate;
   a monitoring unit configured to measure and analyze a degree, by which the LID and the healing occur, through measurement of LID reduction states and characteristics measured by the solar cell module;
   a power supply unit configured to supply electric power to the induction coil plate to apply a frequency and a current to the solar cell module located in the resonant heating mechanism; and
   an infrared ray temperature sensor unit configured to sense a surface temperature of the solar cell module in a noncontact scheme,
   wherein the induction coil plate is horizontally located at a lower portion of the resonant heating mechanism to apply a vertical load due to a dead load of the solar cell module,
   wherein the induction coil plate includes a plurality of coil holes formed on a surface thereof such that a frame of the solar cell module is located deep,
   wherein the induction coil plate generates an induced AC magnetic field by using a half-bridge resonance circuit,
   wherein the treatment unit supplies an induced resonant frequency of an AC wave to the solar cell module located in the resonant heating mechanism through the inverter, and
   wherein the treatment unit applies a uniform current to the solar cell module through the power supply unit that excites the solar cell module.

2. The apparatus of claim 1, wherein a front glass part of the solar cell module is adhered to the induction coil plate such that the induced magnetic field is applied and maintained to all the solar cells in the interior of the solar cell module.

3. The apparatus of claim 1, wherein the monitoring unit monitors the LID and the healing that occurs in real time by monitoring a magnitude of the current applied to the solar cell module by the treatment unit.

* * * * *